May 7, 1963 J. F. McMAHON, JR., ET AL 3,088,299

METHOD OF MAKING GLASS TO METAL SEAL

Filed July 14, 1960

INVENTORS
JOHN F. McMAHON, JR.
JOHN RUSSELL FAHEY
BY Albert H. Charland
ATTORNEY United States Patent Office 3,088,299

Patented May 7, 1963

3,088,299

METHOD OF MAKING GLASS TO METAL SEAL

John F. McMahon, Jr., and John Russell Fahey, Lansdale, Pa., assignors, by mesne assignments, to Philco Corporation, Philadelphia, Pa., a corporation of Delaware Filed July 14, 1960, Ser. No. 42,904
4 Claims. (Cl. 65—49)

The present invention relates to the art of constructing electrical devices, and more particularly to a novel and improved method of manufacturing stem units for semiconductor devices.

Stem units of the kind mentioned usually comprise a retaining element or eyelet provided with perforations to receive elongated leads supported in and isolated from each other by means of a glass-to-metal seal formed in said element or eyelet. In the production of this kind of stem units, it is important that the leads be properly positioned and aligned with respect to each other and also with respect to the metal encapsulating structure in order to prevent leakage, to protect against electrical shorts, and in general, to insure satisfactory over-all operation of the semiconductor device. For these purposes, leads must be maintained in accurate relationship during firing of the unit to fuse the glass-to-metal seal. Holding of the leads while the stem assemblies are fed through a firing furnace, has given rise to considerable problems and difficulties.

These problems and difficulties arise particularly in connection with the provision of suitable jigging capable of maintaining lead orientation throughout the firing process and of preventing the formation of objectionable glass fillets about the lead wires. Jigs and fixtures devised for the purposes stated above, have generally been too complicated and expensive to use in mass production procedures, and the jigging problem becomes particularly acute when dealing with smaller size stems. The greatest difficulty lies in maintaining concentricity between the leads and the apertures in the eyelet because any relative movement during firing produces stems with excessive electrical leakage between lead and eyelet. Moreover, in the glass-to-metal sealing process, the glass must wet the metal to produce an effective seal so that molten glass tends to crawl along the metal parts thereby forming glass fillets which extend from the eyelet into the space provided within the encapsulating structure for accommodating the semiconductor element and its associated connectors and leads. Such fillets are objectionable not only because they occupy critical space and are likely to interfere with the operation of the semiconductor device, but also because they are subject to breakage with the attendant possibilities of loose glass in the packaged unit as well as to rupture of the hermetic seal.

Accordingly, it is a general object of this invention to provide a novel and simplified method of producing stem units, which method does away with the difficulties and problems noted above.

It is also an object of the invention to provide for firing of stem units in a manner which insures that the leads will remain in desired position and which insures better control over the formation of glass fillets around the leads.

The invention is particularly characterized by the fact that it insures maintenance of lead orientation throughout the manufacturing process without the use of intricate and expensive jigs, fixtures and similar devices.

Another characteristic feature of the invention resides in the fact that it readily lends itself to mass production procedure by making it possible to hold and fire a larger number of stem units at one time. This is feasible because in accordance with the invention the units to be fired can be placed closely adjacent one another within a considerably smaller area than has heretofore been possible.

Briefly stated, the method of the invention comprises implanting in a mat of heat-resistant fibrous material, those portions of the leads which protrude from the perforated wall of the encapsulating element devised to retain the mass of sealing glass with said leads extending therethrough, and then firing said units while utilizing the aforesaid mat to maintain the leads in proper alignment with respect to each other during fusion of the glass and formation of the glass seal. In accordance with the invention, the implanting of the leads in the mat of heat resistant fibrous material is such that the retaining element becomes embedded in said mat which then serves to oppose the flow of molten glass through the perforations in said element.

The nature, objects, and advantages of the invention will be more fully understood from the following description based on the accompanying drawing in which.

Figures 1, 2, 3, 4, 5:
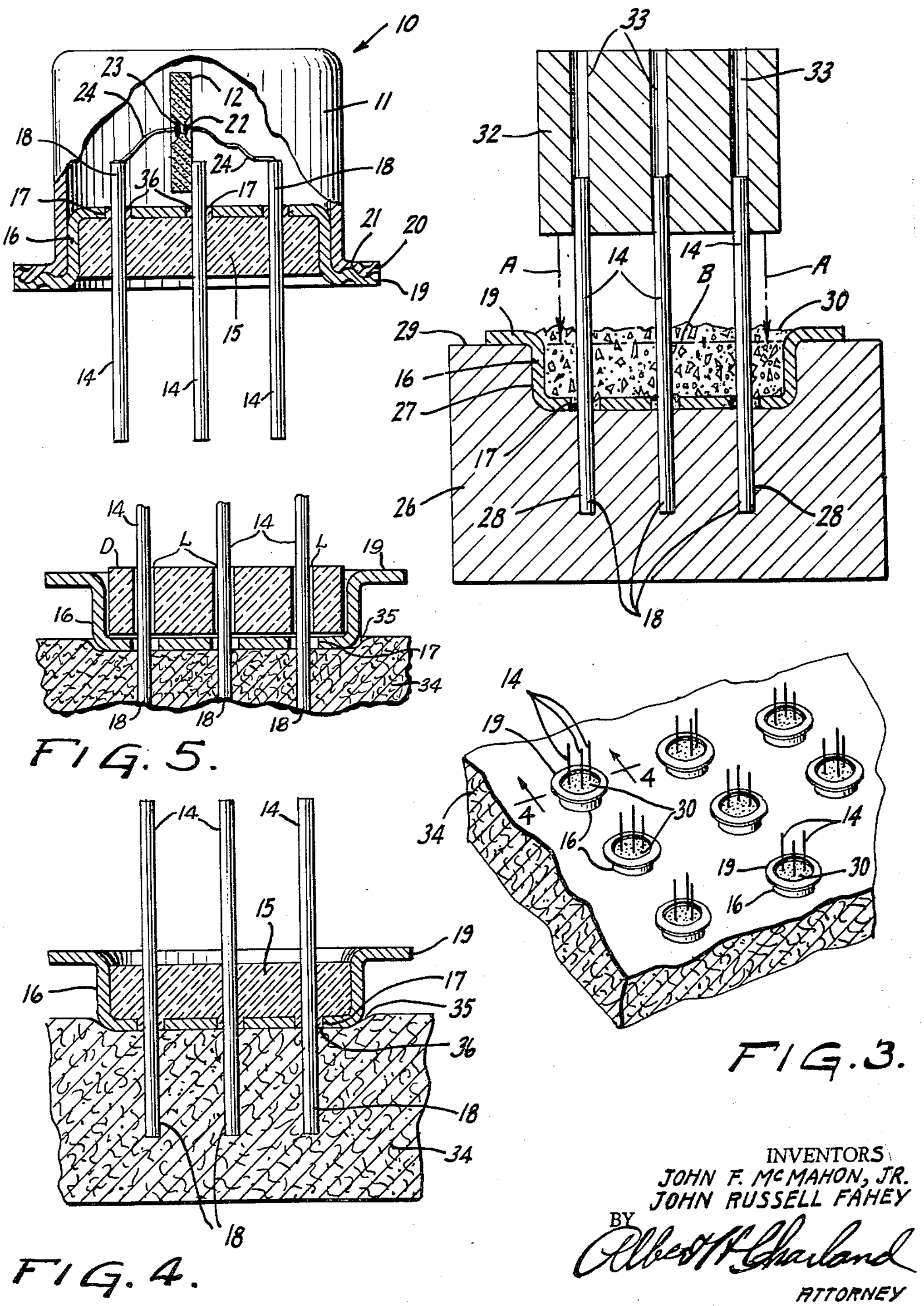
FIGURE 1 is a side view, partly in elevation and partly in section, illustrating a semiconductor device embodying a stem unit produced in accordance with the present invention, the device being drawn on a greatly exaggerated scale for clarity of illustration.
FIGURE 2 is a sectional view showing a preferred mode of effecting the assembly of a stem unit adapted to be fired while supported in accordance with the present invention.
FIGURE 3 is a perspective view, on a reduced scale, illustrating the manner in which stem units are supported for mass firing in accordance with the principles of the invention.
FIGURE 4 is an enlarged sectional view taken substantially on line 4—4 of FIGURE 3 and illustrating one of the stem assemblies after the firing.
FIGURE 5 is a fragmentary view similar to FIGURE 4 but showing a modified mode of associating glass with the stem eyelet and leads.

Referring more particularly to the drawing, there is shown in FIGURE 1 a semiconductor device 10 which comprises an outer metallic casing 11 adapted to house a semiconductive body 12 connected to leads 14, the latter serving to support said body and to provide for connections outside the device. The leads 14 are anchored in a glass-to-metal seal 15 formed within a retaining base or eyelet 16 which is provided with perforations 17 through which portions 18 of said leads protrude. This base element or eyelet has a laterally extended flange 19 disposed to abut a correspondingly extended flange 20 on the casing 11. The casing 11, seal 15 and eyelet 16 cooperate to provide an envelope hermetically sealing the semiconductive body 12 and protecting it against moisture and atmospheric contaminants. For that purpose, and according to usual practice, the glass seal 15 is fused to the leads 14 and to the eyelet 16, and the casing 11 and eyelet 16 are united together by means of a cold-weld hermetic joint 21.

As shown, the semiconductive body 12 is of the well known germanium wafer type having an emitter electrode 22 and a collector electrode 23 which are, respectively, disposed on opposite faces of said semiconductive body or wafer 12. These electrodes can be and preferably are formed in accordance with the conventional etching-and-plating process, and conductors 24 consisting of fine flexible nickel wire are connected to said electrode and to the portions 18 of the appropriate leads 14, in the manner customary in the art.

The initial steps in the performance of the method of this invention have to do with the assembly of the conductive leads 14 and eyelet 16 through the intermediary of the material employed for the glass-to-metal seal 15.

A preferred way of accomplishing this assemblage of elements is illustrated in FIGURE 2 wherein there is shown a mold or die 26 formed with an eyelet-receiving cavity 27, the bottom surface of which is provided with blind bores 28 arranged in predetermined position with respect to each other for receiving the protruding portions 18 of the leads 14 and for locating said leads in desired relationship with respect to each other. The cavity 27 is of a depth permitting the eyelet 16, on insertion thereof within said cavity, to rest on the cavity floor with the eyelet flange 19 lying upon the upper surface 29 of the die 26.

With the eyelet and conductor pins in position within the die 26, the eyelet cavity is filled with powdered glass 30 which is then compacted by means of a piston 32 brought into bearing relation with the powdered glass as represented by the arrows at A and broken line B in FIGURE 2. The piston 32 has apertures 33 which are disposed to receive the leads 14 and to register with the bores 28 of the die 26. Thus proper orientation of said leads during compression of the powdered glass is maintained by function of the piston which is adapted to slide within the eyelet 16.

It will be understood that the compressive force which the piston imposes on the powdered glass produces adequate mechanical integration of the glass particles to retain the leads 14 in requisite orientation during subsequent handling of the assembled elements. However, during firing of the assembled elements, the molten glass cannot be depended upon to maintain the leads 14 in required proper orientation.

Accordingly, in particular accordance with the present invention, the leads 14 are retained in the desired orientation by implanting the protruding end portions 18 of said leads into a mat 34 of heat resistant fibrous material, one wall of the eyelet becoming embedded into said mat as clearly seen at 35 in FIGURE 4 of the drawing. This implantation of the leads in the mat 34 firmly sustains said leads during firing so that the latter remain properly oriented throughout the formation of the glass-to-metal seal. Also, during firing, the molten glass is prevented from flowing along the leads by function of the mat 34 into which the retaining element or eyelet 16 is embedded. However, as clearly appears in FIGURE 4, the mat actively assists in the formation of a glass-to-metal seal which extends into the eyelet perforations 17 to form solid glass portions 36 for thermally and electrically isolating the leads 14 from the eyelet 16.

To carry out the purposes of the invention, the mat 34 is of material such that it will not be affected by the firing temperature required for fusion of the glass-to-metal seal. Satisfactory results are obtained by constructing the mat from refractory mineral fibers which can be formed into tightly compressed matting without the use of binder agents. In this respect, it has been found that a mat consisting of kaolin fibers is particularly well suited to the practice of the invention. Of course other material having properties generally similar to kaolin fibers can be used to form a mat which will satisfactorily maintain the leads 14 of the stem units in proper orinetation and which will resist the glass melting temperature during the firing of said stems. For example mats made of zirconia fibers or mats manufactured from a mixture of alumina and silica, would be satisfactory in the practice of the invention.

From the foregoing description it will be appreciated that the invention makes it possible to mass produce stem units in which proper orientation of the conductor pins and formation of mechanically strong glass-to-metal seals are assured. While a preferred embodiment of the invention has been shown and described, it will be recognized that the invention is not necessarily limited to that embodiment. For instance, the invention can be advantageously used in connection with stems in which, as represented in FIGURE 5 of the drawing, a preformed solid glass cylinder or disk D having lead receiving apertures L is employed instead of powdered glass in assembling the stem eyelet and leads for association with the mat of refractory fibrous material. Accordingly, it will be understood that the invention embraces such changes and modifications as come within the scope of the appended claims.

What we claim is:

1. The method of manufacturing stem units having conductive leads mounted in a glass-to-metal seal on a conductive perforated retaining element, comprising placing the leads in position within the perforations of the element so that portions of said leads extend therethrough, placing glass in association with said element and said leads, implanting in a mat of heat-resistant fibrous material the portions of said leads which protrude from one wall of said element, embedding said one wall in said mat, and firing the units while utilizing said mat to maintain the leads in said position and to prevent the flow of molten glass through said perforations and formation of fillets along said leads during fusion of the glass and formation of the glass-to-metal seal.

2. The method of manufacturing stem units having conductive leads mounted in a glass-to-metal seal on a conductive perforated retaining element, comprising placing the leads in position within the perforations of the element so that portions of said leads extend therethrough, temporarily holding said leads in position with respect to said element by compacting powdered glass in said element and about said leads, implanting in a mat of heat-resistant fibrous material the portions of said leads which protrude from one wall of said element, embedding said one wall in said mat, and firing the units while utilizing said mat to maintain the leads in said position and to prevent the flow of molten glass through said perforations and formation of fillets along said leads during fusion of the glass and formation of the glass-to-metal seal.

3. The method of manufacturing stem units having conductive leads mounted in a glass-to-metal seal on a conductive perforated retaining element, comprising placing the leads in position within the perforations of the element so that portions of said leads extend therethrough, placing a perforated glass body in engagement with said element and leads with the leads projecting from one side of said element in engagement within the apertures of said body, implanting in a mat of heat-resistant fibrous material the portions of said leads which protrude from the other side of said element, embedding said other side of the element in said mat, and firing the units while utilizing said mat to maintain the leads in said position and to prevent the flow of molten glass through the perforations of said element and the formation of fillets along said leads during fusion of the glass body and formation of the glass-to-metal seal.

4. In the manufacture of stem units of the kind comprising a metal eyelet and leads carried in a glass-to-metal seal and passing through perforations in said eyelet, the steps of implanting the leads in a mat of heat-resistant fibrous material, embedding the eyelet in said mat, and thereafter firing the units while utilizing said mat to maintain the leads in position and to prevent the flow of molten glass through said perforations and thereby prevent formation of fillets along said leads during fusion of the glass and formation of the glass-to-metal seal.

References Cited in the file of this patent

UNITED STATES PATENTS

| | | |
|---|---|---|
| 2,773,158 | Myers | Dec. 4, 1956 |
| 2,837,855 | Hoke | June 10, 1958 |
| 2,952,231 | Chyle et al. | Sept. 13, 1960 |

FOREIGN PATENTS

| | | |
|---|---|---|
| 566,982 | Belgium | May 14, 1958 |